United States Patent
Brown, III

(10) Patent No.: US 10,540,820 B2
(45) Date of Patent: Jan. 21, 2020

(54) INTERACTIVE VIRTUAL REALITY SYSTEM FOR EXPERIENCING SOUND

(71) Applicant: CTRL5 Corp, Brooklyn, NY (US)

(72) Inventor: Robert Owen Brown, III, Brooklyn, NY (US)

(73) Assignee: CTRL5, Corp., Wilmington, DE (US)

(*) Notice: Subject to any disclaimer, the term of this patent is extended or adjusted under 35 U.S.C. 154(b) by 31 days.

(21) Appl. No.: 15/886,810

(22) Filed: Feb. 1, 2018

(65) Prior Publication Data

US 2018/0218541 A1    Aug. 2, 2018

Related U.S. Application Data

(60) Provisional application No. 62/453,779, filed on Feb. 2, 2017.

(51) Int. Cl.
*G06T 19/00* (2011.01)
*H04N 13/344* (2018.01)
*H04S 7/00* (2006.01)

(52) U.S. Cl.
CPC ......... *G06T 19/006* (2013.01); *H04N 13/344* (2018.05); *H04S 7/40* (2013.01)

(58) Field of Classification Search
None
See application file for complete search history.

(56) References Cited

U.S. PATENT DOCUMENTS

| 6,448,971 | B1* | 9/2002 | Seefeldt | G06T 15/04 345/475 |
| 2015/0217207 | A1* | 8/2015 | Mickus | A63J 5/10 348/163 |
| 2015/0243066 | A1* | 8/2015 | Mickus | H04R 29/008 345/473 |

FOREIGN PATENT DOCUMENTS

WO    WO-2006013311 A1 *   2/2006   ........... G09B 21/009

OTHER PUBLICATIONS

Sykes L.J. "The Augmented Tonoscope: Towards a Deeper Understanding of the Interplay between Sound and Image in Visual Music", Ph.D. Thesis, Manchester Metropolitan University, Feb. 2015. (Year: 2015).*
Gingrich et al "KIMA—A Holographic Telepresence Environment Based on Cymatic Principles", Leonardo, 46(4), pp. 332-343, 2013. (Year: 2013).*

* cited by examiner

*Primary Examiner* — Kee M Tung
*Assistant Examiner* — Patrick F Valdez
(74) *Attorney, Agent, or Firm* — Travis R. Banta; TechLaw Ventures, PLLC

(57) ABSTRACT

This disclosure generally relates to a system, which includes a processor to receive video of a cymatic effect. The video of the cymatic effect may be converted into a virtual reality effect which includes a virtual reality representation of the cymatic effect. The virtual reality effect may then be output by the processor to a virtual reality device for display to a user.

19 Claims, 5 Drawing Sheets

INTERACTIVE VIRTUAL REALITY SYSTEM FOR EXPERIENCING SOUND

PRIORITY CLAIM

This application claims priority to U.S. Provisional Application No. 62/453,779, filed on Feb. 2, 2017, which is herein incorporated by reference in its entirety.

BACKGROUND

1. Technical Field

Most users experience music by listening to music that is played through speakers, headphones, ear buds, etc. Users may also experience music by viewing video content of performers (e.g., singers, musicians, bands, symphonies, etc.) playing and/or performing music in music videos, movies, etc.

2. Description of the Related Art

Virtual reality ("VR") systems enable users to experience video and other forms of media content by viewing in three dimensions a VR image, video, graphics, etc. (a "VR mesh") that is projected on one or more screens in a manner that makes it difficult for a user to distinguish between VR and actual physical reality. By way of example, a user may wear a VR headset (e.g., that includes a screen for viewing VR video, a speaker for sound, etc.) and/or may view one or more screens that project a dynamic, three-dimensional VR environment of, say, a pilot within a cockpit flying an aircraft. The user may experience the VR environment by turning her head in any direction (e.g., from side to side, up and down, front or back, etc.) and seeing and/or hearing what the pilot sees and/or hears as though the user was actually in the cockpit flying of the aircraft. Unfortunately, such VR systems do not enable a user to experience music and/or other forms of audio content in a visual three-dimensional VR environment as if the user was within and/or inside the music itself.

SUMMARY

Disclosed herein is a cymatic system. The cymatic system includes a processor and receives video of a cymatic effect, which may be created by exposing a cymatic material contained within a cymatic container to acoustic waves with one or more characteristics. The video of the cymatic effect may be converted, by the processor, into a virtual reality effect. The virtual reality effect may include a virtual reality representation corresponding to the cymatic effect. The virtual reality effect may then be output to a virtual reality device for display to a user.

Also disclosed herein is method of providing a virtual reality display. The method includes receiving, by one or more processors, a video of a cymatic effect. Once the video of the cymatic effect is received by the one or more processors, the video of the cymatic effect may be converted into a virtual reality effect. The virtual reality effect may be output by the one or more processors, to a virtual reality device.

Finally, disclosed herein is a non-transitory computer-readable storage medium containing computer instructions which, when executed by a processor, cause the processor to perform a method. The method includes receiving, by one or more processors, a video of a cymatic effect. Once the video of the cymatic effect is received by the one or more processors, the video of the cymatic effect may be converted into a virtual reality effect. The virtual reality effect may be output by the one or more processors, to a virtual reality device

BRIEF DESCRIPTION OF THE DRAWINGS

The accompanying drawings illustrate an embodiment of a cymatic virtual reality system.

DETAILED DESCRIPTION OF PREFERRED EMBODIMENTS

Figure 1:
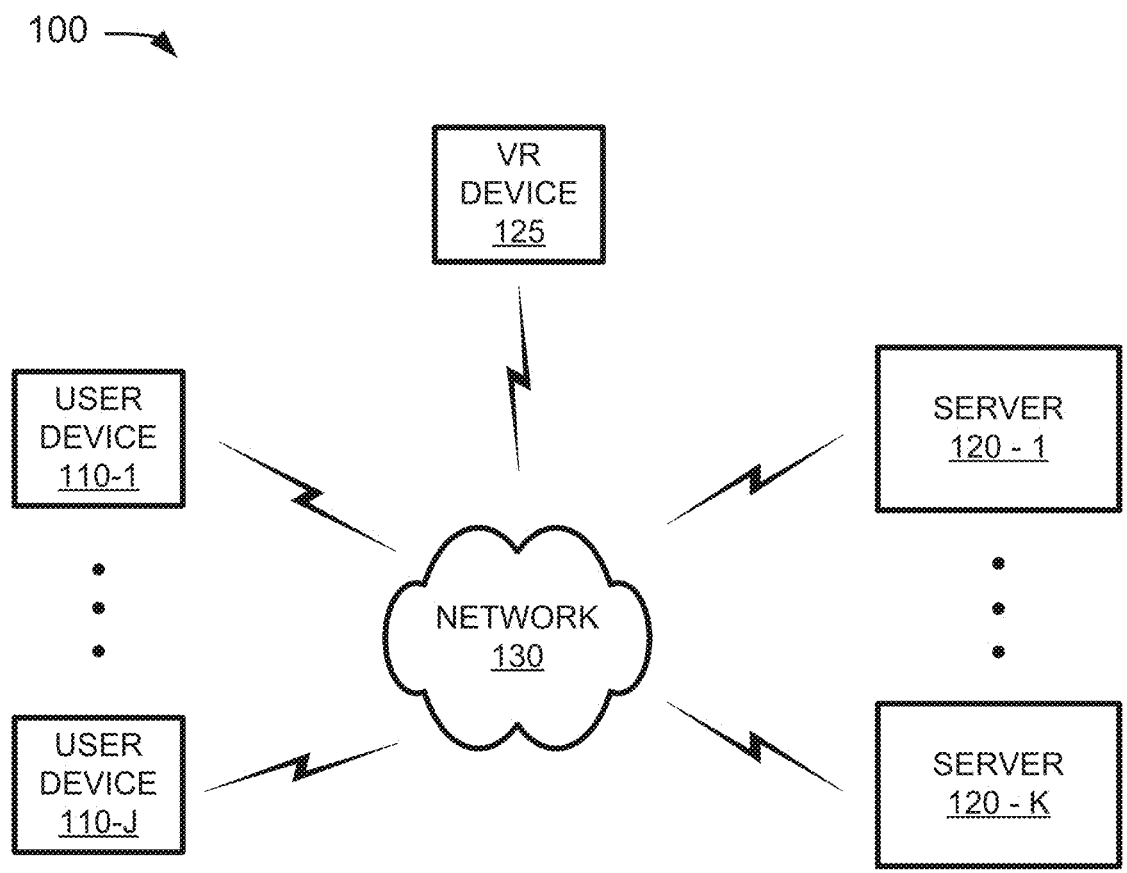
FIG. 1 illustrates a block diagram of a cymatic virtual reality system.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

The systems, methods, technologies, and/or techniques (hereinafter referred to as the "systems and/or methods"), described herein, may enable sound waves (e.g., from music and/or other audio content) to be represented as visible modal vibrational patterns (known as "cymatics" or "cymatic patterns") that are projected into an audio and/or visual virtual reality ("VR") environment to be audibly, visually, and physically experienced by a user in a manner that leaves the user with the perception of being immersed within and/or "inside" the sound and/or cymatic visual manifestations thereof. The systems and/or methods may include a VR device that can obtain audio content (e.g., an analog and/or digital audio recording of music, sound track, etc.) and may use the audio content to obtain cymatic patterns associated with the audio content. In one non-limiting example, the VR device may play the audio content through one or more speakers that are in contact with, or proximity of, a material (e.g., grains of sand, a powder, a liquid, etc.). The one or more speakers may vibrate when playing the audio content, which may cause the material to move in a manner that allows modal vibrational patterns, associated with the audio content (e.g., based on frequency and amplitude of the audio content) to be displayed in three dimensions (e.g., often as waves, peaks and valleys, and/or other three-dimensional patterns) within the material (hereinafter referred to as a "cymatic pattern"). The cymatic patterns may change in shape, color, dimensions (e.g., height, width, length, etc.), etc. based on changes in the tone, beat, volume, frequency, tempo, and/or other characteristics of the audio content. In this example, the VR device may obtain a video recording (e.g., using one or more a camera, a video scanner, a laser scanner, etc.) in two- and/or three-dimensions (e.g., from one or more perspectives and/or points of view) of the cymatic patterns, associated with the audio content, that set up within the material. The video recording may correspond to a digital cymatic pattern that can be stored and/or digitally processed by the VR device in a manner described herein. More simply put, the term cymatics refers to a physical response of a cymatic material to acoustic energy to produce a cymatic effect. Although virtually any material may be a cymatic material, one example may include various colors of paint disposed within a container and subject to acoustic energy, such as a musical note. Different notes will cause different physical responses in the paint within the container, causing intermixed colors of paint to jump up from the surface of the paint in drops or bands of paint, producing an aesthetically pleasing cymatic display. This application discloses systems, devices, methods, and storage media that facilitate the conversion of a physical cymatic effect into a virtual representation of a cymatic effect for display within a virtual reality device, which may provide an immersive virtual reality experience or an augmented reality non-immersive experience, as will be discussed below.

Additionally, or alternatively, the VR device may include logic (e.g., comprised of software, hardware, and/or a combination of software and hardware) that may enable the VR device to process the audio content to create, compute and/or digitally synthesize the cymatic patterns graphically in two and/or three dimensions (e.g., using computer generated graphics). The VR device may also, or alternatively, process or convert video recordings of the cymatic patterns described above in the previous paragraph to digitize, enhance, modify or synthesize cymatic patterns using computer generated graphics to create digital cymatic patterns.

Additionally, or alternatively, data representative of sound may serve as an input to a VR device. For example, in an embodiment where the VR device may synthesize cymatic patterns using computer generated graphics to create digital cymatic patterns, the VR device may obtain sound data from a sound source. Sound sources include devices that may be used to record or store sound in a memory device or object. For example, sound data may be stored on a record, a magnetic tape, compact disc, a music storage device, or other device which may be connected to the VR device to provide data representative of sound (e.g., sound data) to the VR device. The VR device may receive the data representative of sound and synthesize cymatic patterns based on characteristics of the sound in the data representative of sound, using the techniques described herein. In other words, the VR device may, in lieu of video content of a particular cymatic effect or cymatic pattern, receive data representative of sound and generate or synthesize a cymatic effect based on the received data representative of the sound without relying on video based cymatic effect content.

Additionally, or alternatively, the VR device may communicate with a server device via wired and/or wireless connection to obtain information and/or data associated with the audio content and/or the digital cymatic patterns related to the audio content. Additionally, or alternatively, the VR device may use a wired and/or wireless connection to communicate with a server device (e.g., via the Internet or some other public and/or private network), to obtain audio and/or video content of a performer performing music. The VR device may also obtain video content of the performer using two or more camera to obtain three-dimensional, multiperspective video content of the performer performing a musical piece on which the audio content is based. In a non-limiting example, the VR device may integrate multiple depth maps and multi-color (e.g., red, green blue (RGB)) feeds into a three-dimensional, multiple perspective collection of video content of the performer performing in three-dimensional space.

The VR device may process the digital cymatic patterns to enable such patterns to be displayed within a VR environment. For example, the VR device may process the digital cymatic patterns and/or the video of a performer to cause the scale to increase and/or decrease. In a non-limiting example, the VR device may increase the scale of the cymatic patterns and/or performer in a manner that enables the user to experience life-size (e.g., on a scale similar to the user) and/or larger-than-life size patterns and/or video images of a performer (e.g., on a scale that is significantly larger than the user). In this example, cymatic pattern with a height of two inches may appear as twenty feet tall when viewed by a user in a VR environment. The VR device may also, or alternatively, process the digital cymatic patterns and/or the video recording of a performer to change the appearance of the pattern and/or performer, respectively (e.g., in terms of color, texture, opaqueness, translucence, etc.). The VR device may process the digital cymatic pattern to create a two- and/or three-dimensional VR mesh of the patterns that the user may perceive as having physical characteristics or states of matter, such as, for example, one or more threads, a liquid, granules, powder, light, a malleable solid, etc. that behave like waves, energy pulses, light rays (straight and/or curved), etc.

The VR device may combine the audio content with the video cymatic patterns and/or the processed video cymatic patterns to create a VR signal. In one example, the VR device may use Unreal Engine®, Unity and Open GL® to combine the audio content, cymatic patterns, and/or effects signal (described below) to create the VR signal to be played and/or displayed via the VR environment. The VR signal may be played and/or displayed within a VR environment (to be described in greater detail below) to be viewed, heard, and/or otherwise experienced by the user. The VR device may output the VR signal to a user device to allow the user device to play and/or display the VR signal within a remote VR environment created by the user device when executing a VR application (to be described in greater detail below). The remote VR environment may be formed by the user device (e.g., equipped with a headset that may include one or more of goggles/glasses, speaker, display, etc.) viewed, heard, and/or otherwise experienced by the user. The VR environment may display the cymatic patterns in a manner that changes in appearance (e.g., color, texture, opaqueness, translucence, etc.) and/or undulates based on the characteristics (e.g., amplitude, frequency, beat, tone, tempo, etc.) of the audio content. Additionally, the three-dimensional projection of the cymatic pattern within the VR environment may enable the user to perceive that he/she is located amongst and/or within the undulating and ever-changing cymatic patterns as if the user was "within" the audio content and/or the cymatic patterns.

The VR device may sense movement of the user when the user is within and/or viewing the VR environment. Sensing the movement of the user may enable the VR device to project the cymatic patterns from whatever perspective the user is viewing (e.g., when the user looks up, down, sideways, front, back, etc.). Sensing the movement may also, or alternatively, enable the user to interact with the VR environment to cause, for example, the VR device to change the cymatic patterns (e.g., change the size, texture, color, undulating frequency, amplitude, etc.) based on movements made by the user (e.g., hand movements, walking, jumping, crouching, etc.) and/or voice commands from the user. Additionally, or alternatively, the user may interact with a user interface, associated with the VR device (and/or VR environment) to generate special effects on the VR signal being displayed via the VR environment. Such effects may include changing the audio content (e.g., volume, bass, treble, tone, tempo, etc.) and/or digital cymatic patterns (e.g., color, scale, type, opaqueness, translucency, mesh type (e.g., liquid, light rays, threads, waves, granules, powders, etc.).

FIG. 1 is a diagram of an example environment 100 in which the systems and/or methods, described herein, may be implemented. As shown in FIG. 1, environment 100 may include a group of user devices 110-1, . . . , 110-J (collectively referred to herein as "user devices 110," and individually as "user device 110") (where J≥1) a group servers 120-1, . . . , 120-K (collectively referred to herein as "servers 120" and individually as "server 120") (where K≥1), and a VR device 125, some or all of which are interconnected by a network 130. The number of devices and/or networks, illustrated in FIG. 1, is provided for explanatory purposes only. In practice, there may be additional networks and/or devices, fewer networks and/or devices, different networks and/or devices, or differently arranged networks and/or devices than illustrated in FIG. 1.

Also, in some implementations, one or more of the devices of environment 100 may perform one or more functions described as being performed by another one or more of the devices of environment 100. Components of environment 100 may interconnect via wired connections, wireless connections, or a combination of wired and wireless connections.

User device 110 may include any computation or communication device, such as a wireless mobile communication device, that is capable of communicating with network 130. For example, user device 110 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal computer, a camera, a personal gaming system, or another type of computation or communication device.

User device 110 may further perform communication operations by sending data to or receiving data from another device, such as some other user device 110, server 120 and/or VR device 125. User device 110 for example, receive a VR signal from VR device 125 to enable the user to experience and/or interact with audio content with digital cymatic patterns associated therewith. In one non-limiting example, user device 110 may be attached to and/or formed as part of a headset (e.g., that includes goggles with one or more video displays, speakers, etc.) that can be worn by the user to form a remote portable VR environment with which the user may interact and/or experience the VR signal. User device 110 may communicate with application server 120 to obtain a copy of a VR application that, when executed, enables user device 110 to receive the VR signal and/or display the VR signal to enable the user to experience VR audio/visual experience when viewed and/or heard using the headset associated with user device 110.

Data may refer to any type of machine-readable information having substantially any format that may be adapted for use in one or more networks and/or with one or more devices. Data may include digital information or analog information. Data may further be packetized and/or non-packetized. User device 110 may include logic for performing computations on user device 110 and may include the components illustrated in FIG. 2 in an example implementation.

Server 120 may include one or more server devices, or other types of computation or communication devices, that gather, process, search, store, and/or provide information in a manner described herein. Server 120 may communicate via network 130. Server 120 may store audio content and/or digital cymatic patterns associated with audio content. Server 120 may output audio content and/or digital cymatic patterns associated therewith to VR device 125 in response to a request received from VR device 125. In one example, server 120 may correspond to an application server 120 that stores and/or manages a VR application that includes logic (e.g., based on software, hardware, or a combination of software and hardware) that, when downloaded and/or executed by VR device 125 and/or user device 110, enables VR device 125 to perform the operations described herein and/or user device 110 to receive, process and/or display a VR signal to create a remove VR environment to be experienced by the user.

VR device 125 may include one or more components that are capable of obtaining or generating certain information relating to VR signal based on audio content and/or cymatic patterns related thereto. For example, VR device 125 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal computer, a camera, a personal gaming system, or another type of computation or communication device. Additionally, or alternatively, VR device 125 may include one or more components as described below with respect to FIG. 3. In one nonlimiting example, VR device 125 may communicate and/or register with application server 120 to obtain a VR application to enable VR device 125 to perform some or all of the operations described herein.

VR device 125 may obtain audio content and/or video content associated with a performer of such audio content. VR device 125 may also, or alternatively, obtain video cymatic patterns associated with the audio content. VR device 125 may process the video cymatic patterns to create digital cymatic patterns that can be displayed within a VR environment. VR device 125 may process the cymatic patterns and/or the video of a performer to cause the scale to increase and/or decrease. In a non-limiting example, VR device 125 may increase the scale of the cymatic patterns and/or performer in a manner that enables the user to experience life-size (e.g., on a scale similar to the user)

and/or larger-than-life size patterns and/or video images of a performer (e.g., on a scale that is significantly larger than the user). In this example, a cymatic pattern may appear to the user as one, two, ten, twenty, thirty, fifty, one hundred, etc. feet tall when viewed in a VR environment. VR device 125 may also, or alternatively, process the cymatic patterns and/or the video recording of a performer to change the appearance of the pattern and/or performer, respectively (e.g., in terms of color, texture, opaqueness, translucence, etc.). VR device 125 may process the cymatic pattern to create a two- and/or three-dimensional VR mesh of the patterns that the user may perceive as having physical characteristics or states of matter, such as, for example, one or more threads, a liquid, granules, powder, light, a malleable solid, etc. that behave like waves, energy pulses, light rays (straight and/or curved), etc.

Network 130 may include one or more wired and/or wireless networks. For example, network 130 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 130 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

Figure 2:
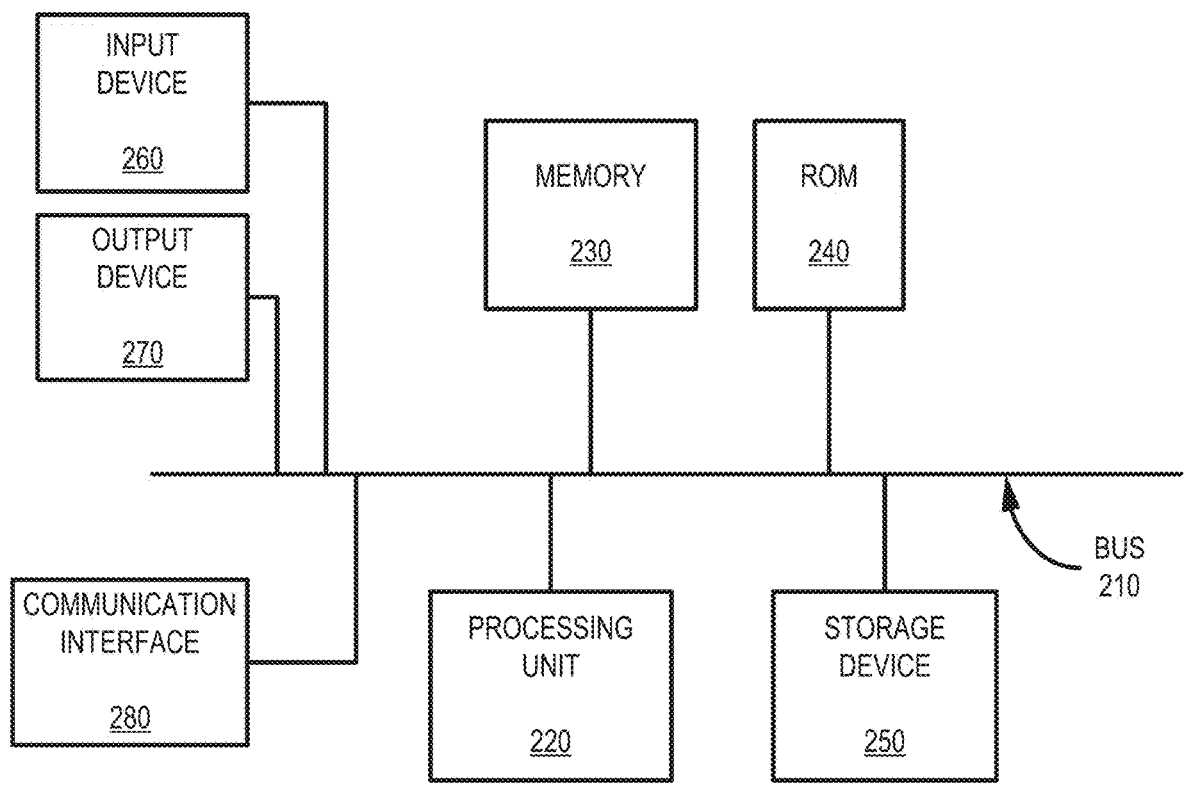
FIG. 2 illustrates a block diagram of a user device associated with a cymatic virtual reality system.

Referring now to FIG. 2, user device 110 and/or server 120 may include a collection of components, such as a bus 210, a processing unit 220, a main memory 230, a read-only memory (ROM) 240, a storage device 250, an input device 260, an output device 270, and/or a communication interface 280. Bus 210 may include a path that permits communication among the components of user device 110 and/or server 120.

Processing unit 220 may include a processor, multiple processors, microprocessors, or other types of processing logic that may interpret, execute, and/or otherwise process information contained in, for example, the storage device 250 and/or memory 230. The information may include computer-executable instructions and/or data that may implement one or more embodiments of the systems and/or methods. Processing unit 220 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 220 may comprise a single core or multiple cores. Moreover, processing unit 220 may comprise a system-on-chip (SoC) or system-in-package (SiP).

Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to user device 110 and/or server 120, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables user device 110 and/or server 120 to communicate with other devices and/or systems. For example, communication interface 280 may include mechanisms for communicating with another device or system via a network, e.g., a network interface card.

User device 110 and/or server 120 may perform certain operations in response to processing unit 220 executing software instructions contained in a computer-readable medium, such as main memory 230. For instance, user device 110 and/or server 120 may implement a technical computing application by executing software instructions from main memory 230. A computer-readable medium may be defined as a non-transitory memory device, where the memory device may include a number of physically, possibly distributed, memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
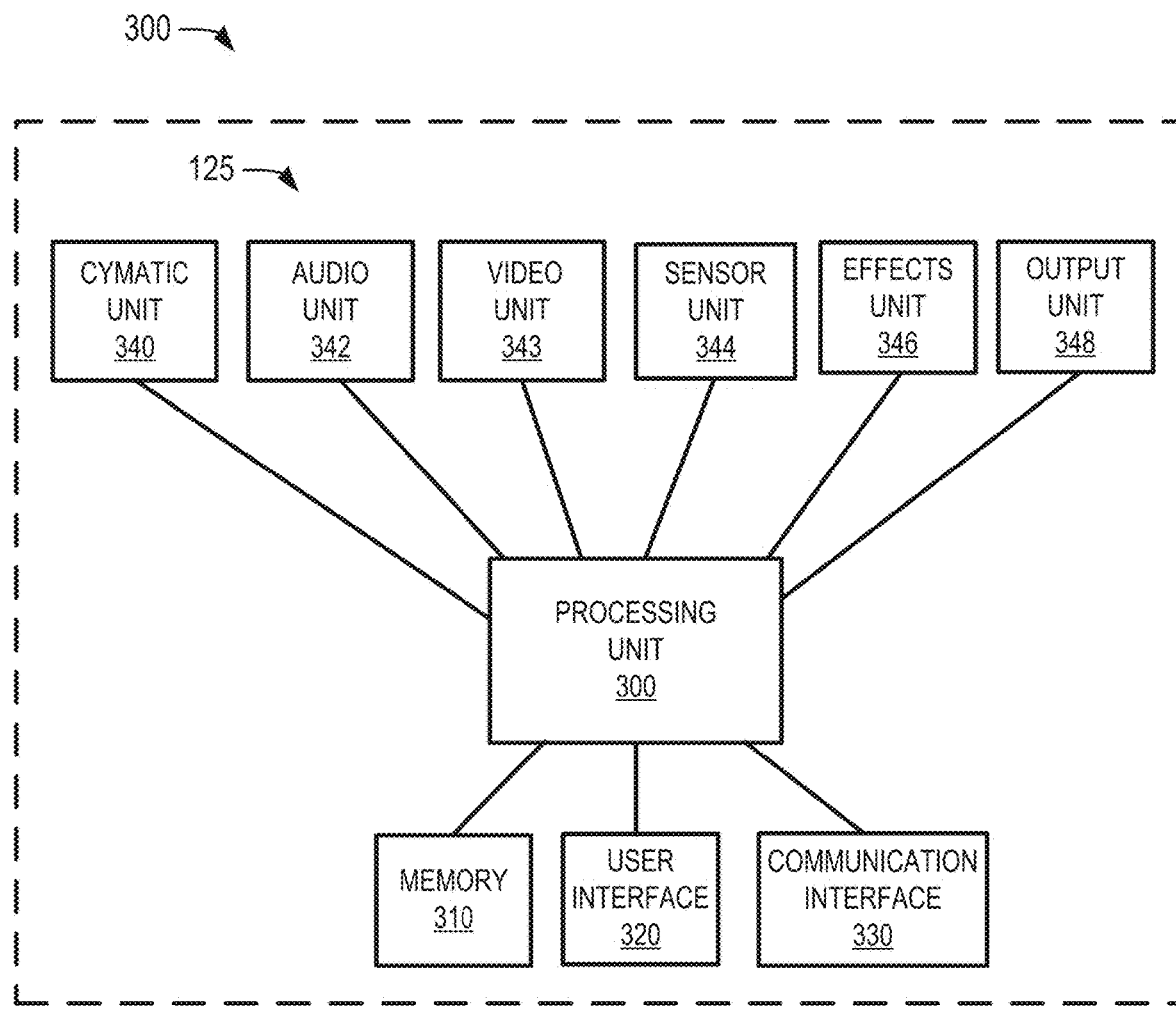
FIG. 3 illustrates a block diagram of exemplary components of a virtual reality device associated with the cymatic virtual reality system.

FIG. 3 is a diagram of example components of VR device 125. As shown in FIG. 3, VR device 125 may include a processing unit 300, a memory 310, a user interface 320, a communication interface 330, an audio/visual unit 340, a cymatic unit 342, a virtual reality unit 343 (hereinafter "VR unit 343"), a sensor unit 344, an effects unit 346 and an output unit 348. Although FIG. 3 shows example components of VR device 125, in other implementations, VR device 125 may include fewer components, additional components, different components, or differently arranged components than depicted in FIG. 3. In still other implementations, one or more components of VR device 125 may perform one or more tasks described as being performed by one or more other components of VR device 125. VR device 125 may be associated with a VR environment 350 via which a user may experience a VR soundscape (e.g., based on a VR signal) and/or interact with VR device 125. Some or all of the components described with respect to FIG. 3 may execute all or a respective portion of a VR application that is obtained from application server 120.

In one non-limiting example such, VR environment 350 include a structure such as that shown in Appendix A (e.g., with a domed roof, curved walls, and/or or some other shape to facilitate and/or enhance sound and/or video quality) with which VR device 125 is associated and into which a VR signal is played and/or displayed to a user or an audience of users. VR environment 350 may include a stage on which a performer may perform and/or play a musical piece and/or some other performance.

Processing unit 300 may include a processor, a microprocessor, an ASIC, a FPGA, or the like. Processing unit 300 may control operation of VR device 125 and its components. In one implementation, processing unit 300 may control operation of components of VR device 125 in a manner similar to that described herein.

Memory 310 may include a RAM, a ROM, and/or another type of volatile or non-volatile memory to store data and/or instructions that may be used by processing unit 300. Memory 310 may be similar to and/or include the same or similar components and/or functionality as memory 230, ROM 240 and/or storage device 250 of FIG. 2. User interface 320 may include mechanisms for inputting information to VR device 125 and/or for outputting information from VR device 125. Examples of input and output mechanisms might include buttons (e.g., control buttons, keys of keypad, a keyboard, a joystick, etc.); a touch screen interface to permit data and control commands to be input into VR device 125 via a display; a biometric device to receive fingerprint scans, retinal scans, facial signatures, etc.; a speaker to receive electrical signals and output audio signals (e.g., based on the audio content); a microphone to receive audio signals (e.g., from a user interacting with VR environment 350 and/or VR device 125) and output electrical signals; a display to output visual information (e.g., user interfaces, web pages, graphics, etc.) associated with the operations of VR device 125 (e.g., powered on or off, volume, effects, etc.); a vibrator to cause VR device 125 to vibrate; and/or a camera to receive video and/or images.

Communication interface 330 may include, for example, a transmitter that may convert baseband signals from processing unit 300 to RF signals and/or a receiver that may convert RF signals to baseband signals; and/or to output optical signals (e.g., Infrared, visual, ultraviolet, or other optical signals). Alternatively, communication interface 330 may include a transceiver to perform functions of both a transmitter and a receiver of wireless communications (e.g., radio frequency, infrared, visual optics, infrared, etc.), wired communications (e.g., conductive wire, twisted pair cable, coaxial cable, transmission line, fiber optic cable, waveguide, etc.), or a combination of wireless and wired communications. Communication interface 330 may connect to and/or include an antenna/sensor for transmission and/or reception of the RF and/or optical signals.

The antenna/sensor may include one or more antennas to transmit and/or receive RF signals over the air. Antenna/sensor may, for example, receive RF signals from communication interface 330 and transmit them over the air, and receive RF signals over the air and provide them to communication interface 330. In one implementation, for example, communication interface 330 may communicate with a network and/or devices connected to a network (e.g., network 130, etc.). Additionally, or alternatively, antenna/sensor may include one or more optical devices to transmit and/or receive optical signals (e.g., visual, infrared, laser, ultraviolet, etc.) over the air or via optical fiber. Antenna/sensor may, for example, receive optical signals from communication interface 330 and transmit them over the air, and receive optical signals over the air and provide them to communication interface 330.

As described in detail above, VR device 125 may perform certain operations described herein in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Audio/video unit 340 may include a one or more components to record, process, store, digitize and/or synthesize an audio signal based on a recorded, stored, or live performance. For example, audio/video unit 340 may include microphone, a synthesizer, an audio recording device, a mixing device, an equalizer component, an amplifier, a filter, an attenuator, an analog to-digital converter, a digital-to-analog converter, etc. Audio/video unit 340 may obtain audio content by recording, downloading (e.g., from a server 120 that provides video and/or audio content via network 130 and/or communication interface 330) storing and/or digitizing (e.g., an analog and/or digital audio recording or live performance of music, sound track, etc.).

Audio/video unit 340 may also, or alternatively, include a camera and/or some other device (e.g., a video camera, an infrared camera, an ultraviolet camera, a focal plane array, a photodiode, an light emitting diode, a phototransistor, etc.) that can sense, sample, record and/or digitize a performer performing a musical piece and/or cymatic patterns created and/or synthesized by cymatic unit 342. Audio/video unit 340 may also, or alternatively, obtain video content of the performer using two or more camera to obtain three-dimensional, multiperspective video content of the performer performing a musical piece on which the audio content is based. In a non-limiting example, audio/video unit 340 may integrate multiple depth maps and multi-color (e.g., RGB, etc.) feeds into a three-dimensional, multiple perspective collection of video content of the performer performing in three-dimensional space. Audio/video unit 340 may use this same technique to obtain three-dimensional, multiple perspective collection of video content of the physical cymatic patterns within a material (created by the speakers playing audio content) in a manner described above.

Cymatic unit 342 may include one or more components to generate, synthesize and/or otherwise obtain a cymatic pattern associated with an audio signal obtained by audio/visual unit 340. Cymatic unit 342 may, for example, include one or more speakers in contact with and/or proximity of one or more cymatic materials (e.g., a fluid (gas, vapor or liquid), granules, a powder, etc.), cymatic engine that uses logic (e.g., based on software, hardware, or a combination of software and hardware) to synthesize digital cymatic patterns based on the audio signal. In one non-limiting example, audio/video unit may cause audio signal to be played through one or more speakers that are in contact with, or proximity of, a material (e.g., grains of sand, a powder, a liquid, etc.) to cause physical cymatic patterns to appear and/or set up in the material based on the audio signal playing through the speakers. For example, the audio signal may cause the speakers to vibrate in a manner that causes the cymatic material to move in three dimensions and/or in a manner that allows modal vibrational patterns, associated with the audio signal (e.g., based on frequency, amplitude, beat, tempo, tone, volume, etc. of the audio signal) to be displayed in three dimensions (e.g., often as waves, peaks and valleys, and/or other three dimensional patterns) within the material to form the cymatic pattern. The cymatic patterns may change in shape, color, dimensions (e.g., height, width, length, etc.), etc. based on the material and/or how the material changes with respect to the tone, beat, volume, frequency, tempo, and/or other characteristics of the audio signal. Cymatic unit 342 and/or processing unit 300 may cause audio/video unity 340 to obtain a video recording (e.g., using one or more of a video camera, a video scanner, a laser scanner, etc.), in two- and/or three-dimensions and/or form one, or preferably more than one perspectives, of the physical cymatic patterns to create video cymatic patterns. Cymatic unit 342 and/or audio/video unit 340 may process the video cymatic patterns to create a digital cymatic pattern associated with the audio signal.

Additionally, or alternatively, cymatic unit 342 and/or processing unit 300 may store and/or execute logic (e.g., comprised of software, hardware, and/or a combination of software and hardware) that may process the audio signal to create, compute and/or digitally synthesize digital cymatic patterns graphically in two- and/or three dimensions (e.g., using computer generated graphics). Cymatic unit 342 may also, or alternatively, process video recordings of the cymatic patters described above in the previous paragraph to digitize, enhance, modify or synthesize cymatic patterns using computer generate graphics.

Additionally, or alternatively, the cymatic unit 342 and/or processing unit 300 may communicate with server device 120 via wired and/or wireless connection to obtain information and/or data associated with the audio signal and/or the cymatic patterns related to the audio signal. Additionally, or alternatively, cymatic unit 342 and/or processing unit 300 may use a wired and/or wireless connection to communicate with server device 120 (e.g., via network 130), to obtain audio and/or video content of a performer performing music.

VR unit 343 may include logic (e.g., based on software, hardware or a combination of software and hardware) to combine a first signal (e.g., a live or recorded audio signal), a second signal (e.g., the digital cymatic patterns associated with the first signal), and/or a third signal (e.g., video content that includes a recording or live performance of music (or some other performance such as a play, sound track, etc.) on which the first signal is based) to create a VR signal that can be played and/or displayed (e.g., by output unit 348) via VR environment 350. VR unit 343 may also, or alternatively, use the logic to process the first signal, second signal, third signal and/or the combined VR signal. For example, VR unit 343 and/or cymatic unit 342 may process the second signal to enable digital cymatic patterns to be displayed within a VR environment. For example, VR unit 343 and/or cymatic unit 342 may process the first signal to manage and/or control the sound quality (e.g., bass, tempo, volume, equalization, frequency, etc.) output by output unit 348 into VR environment 350. VR unit 343 and/or cymatic unit 342 may also, or alternatively, process the second signal and/or the third signal to cause the scale to increase and/or decrease. In a non-limiting example, VR unit 343 and/or cymatic unit 342 may increase the scale of the cymatic patterns and/or performer that is output (e.g., by output unit 348) into the VR environment 350 in a manner that enables the user to experience life-size (e.g., on a scale similar to the user) and/or larger-than-life size cymatic patterns and/or video images of the performer (e.g., on a scale that is significantly larger than the user). In this example, a video and/or digital cymatic pattern with a height of two inches may appear as one, two, ten, twenty, one hundred, etc. feet tall when viewed by a user in VR environment 350. VR unit 343 and/or cymatic unit 342 may also, or alternatively, process the second signal and/or the third signal to change the appearance of the cymatic pattern and/or the performer, respectively (e.g., in terms of color, texture, opaqueness, translucence, etc.).

Additionally, or alternatively, VR unit 343 and/or cymatic unit 342 may process the digital cymatic pattern to create a two- and/or three-dimensional VR mesh of the cymatic patterns in a manner that enables the user to perceive as having physical characteristics or states of matter, such as, for example, one or more threads, a liquid, granules, powder, light, a malleable solid, etc. that behave like waves, energy pulses, light rays (straight and/or curved), etc. As described above, VR unit 343 and/or cymatic unit 342 may combine the first signal, the second signal, and/or the third signal to create the VR signal. In one example, VR unit 343 and/or cymatic unit 342 may use logic (e.g., using Unreal Engine®, Unity, Open GL®, etc. applications) to combine one or more of the signals.

Effects unit 346 may include logic (e.g., using Unreal Engine®, Unity, Open GL®, etc. applications) to generate a fourth signal (sometimes referred to as "effects" or an "effects signal") that effects, controls, and/or otherwise changes the VR signal, and/or one or more of the first, second or third signals. Sensor unit 344 may include one or more sensors (e.g., a camera, an optical sensor, an RF sensor, a motion sensor, a microphone, etc.) to detect the presence, movement, gestures (e.g., based on facial, hand, and/or body gestures of the user) and/or audible commands (e.g., verbal commands and/or other sound of the user) of a user within and/or interacting with VR environment 350. Sensor unit 344 may detect the presence, movement, gestures, and/or auditory input from the user and may output a signal, based thereon, to effects unit 346 that may enable a user to interact with, influence, and/or control effects on the VR signal or its constituent signals.

For example, effects unit 346 may receive a signal from sensor unit 344 and may sense movement of the user when the user is within and/or viewing the VR environment. Sensing the movement of the user may enable effects unit 346 to project the different cymatic perspectives of the cymatic patterns and/or a video recording of a performer within VR environment 350 from whatever perspective the user is viewing (e.g., when the user looks up, down, sideways, front, back, etc.), which may enable the user to interact with VR environment 350 to cause, for example, effects unit 346 to change the cymatic patterns (e.g., change the size, texture, color, undulating frequency, amplitude, etc.) based on movements made by the user (e.g., hand movements, walking, jumping, crouching, etc.) and/or voice commands from the user.

Additionally, or alternatively, the user may interact with user interface 320 to enable effects unit 346 to generate special effects on the VR signal being displayed via VR environment. Such effects may include changing the first signal (e.g., the audio signal's volume, bass, treble, tone, tempo, etc.) and/or the second signal (e.g., video cymatic patterns' color, scale, type, opaqueness, translucency, and/or mesh type (resembling, for example, liquid, light rays, threads, waves, granules, powders, etc.)).

Output unit 348 may include one or more components to play and/or display the first signal (e.g., a live or recorded music or other audio content), second signal (digital cymatic pattern), third signal (e.g., live or recorded video of performer), fourth signal (e.g., effects), and/or the VR signal. Output unit 348 may, for example, include one or more speakers, video displays, equalizers, filters, amplifiers and/or any component that enables the audio and video quality within VR environment 350 to be controlled for the benefit of the user. Additionally, or alternatively, output unit 348 may enable the above identified signals to be output to user device 110 to be played on user device 110.

Output unit 348 may output, to VR environment 350 and/or may transmit to user device 110 to be played within a remote VR environment associated with user device 110 (e.g., using a headset, goggles, etc.), one or more of the first signal, the second signal, the third signal, the VR signal, or any of the forgoing in combination with the fourth signal (effects signal). Output unit 340 may enable such signals to be played and/or displayed within VR environment 350 and/or by user device 110 to be viewed, heard, and/or otherwise experienced by the user. VR environment 350 and/or user device 110 may display the cymatic patterns in a manner that changes in appearance (e.g., color, texture, opaqueness, translucence, etc.) and/or undulates based on the characteristics (e.g., amplitude, frequency, beat, tone, tempo, etc.) of the audio content. Additionally, the three-dimensional projection of the cymatic pattern within VR environment 350 and/or by user device 110 may enable the user to perceive that he/she is located amongst and/or immersed within the undulating and ever-changing cymatic patterns as if the user was "within" the audio content and/or the cymatic patterns.

While series of steps for obtaining audio content, obtaining or generating cymatic patterns, processing, generating a VR signal, creating effects, and outputting the VR signal using VR device 125 are described in connection with FIGS. 1-3, the order of the steps may be modified in other implementations. Further, non-dependent steps may be performed in parallel.

Figure 4:
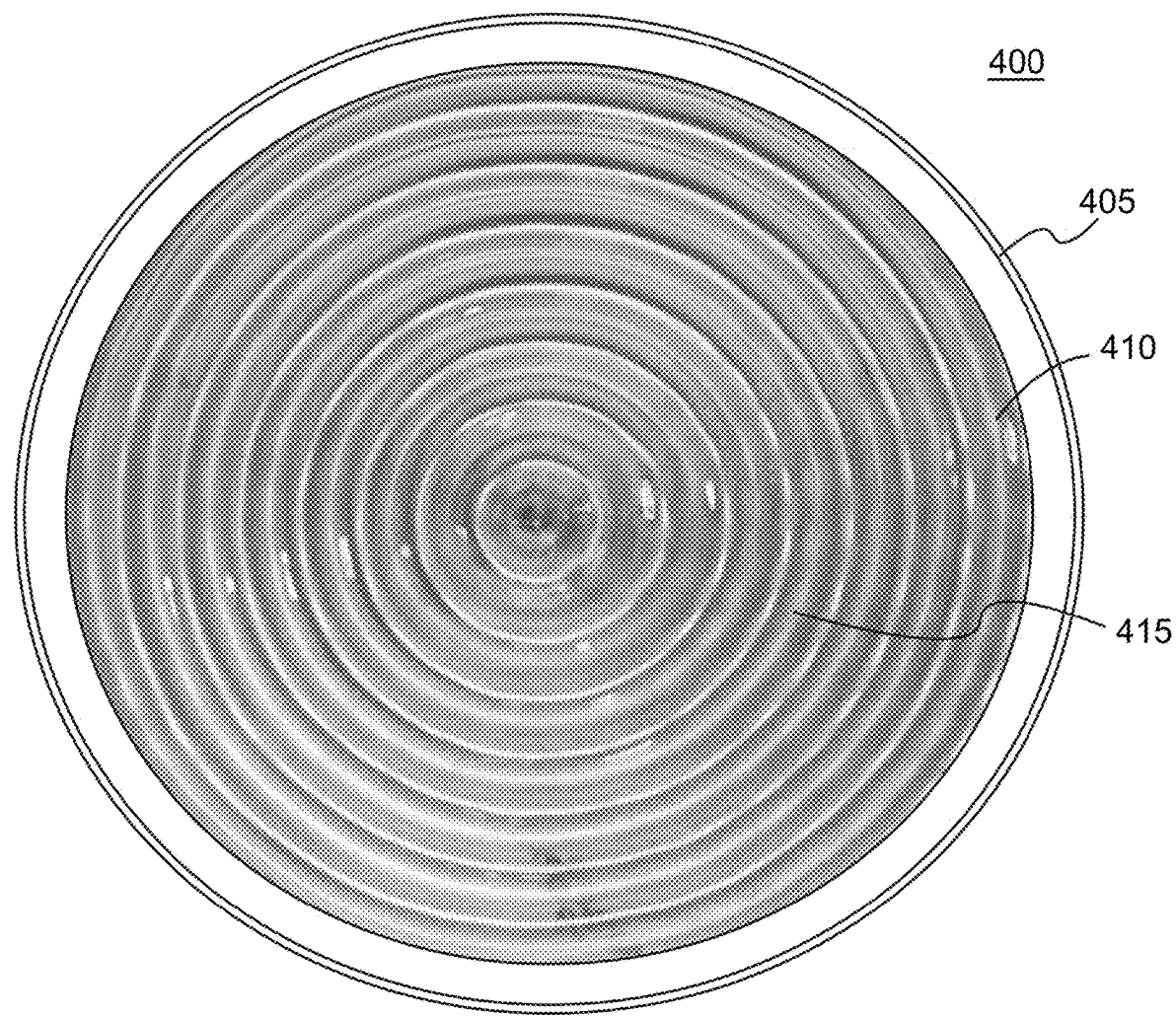
FIG. 4 illustrates an exemplary cymatic effect or cymatic pattern of a cymatic material within a cymatic container.

FIG. 4 illustrates an exemplary system 400 for producing a cymatic effect or cymatic pattern 415 of a cymatic material 410 within a cymatic container 405. A cymatic container 405 may be, as previously discussed, disposed on a speaker or some other sound generating device. Exemplary sound generating devices may include musical instruments, musical amplification equipment, and audio speakers. One purpose of cymatic container 405 is to allow acoustic waves generated by speaker or other sound generating device to flow into or be absorbed by a cymatic material 410 which is contained within cymatic container 405. Cymatic material 410 may include materials that are responsive to acoustic waves, or sound and may include materials such as a fluid (gas, vapor or liquid), granules, a powder, threads, and any other material that may be set into motion by application of acoustic waves to cymatic material 410.

Cymatic material 410 need not be homogenous. Rather, cymatic materials 410 may be combined in any proportion to provide a cymatic effect that combines the properties of the individual cymatic materials. For example, cymatic material 410 may be composed of a combination of a vapor and a powder such that when acoustic waves are applied to the cymatic materials, both materials respond to produce a cymatic effect that combines cymatic responses of the individual materials. As shown as one example in FIG. 4, a cymatic material 410 is provided as a fluid which is undergoing exposure to acoustic waves provided by a sound source. The acoustic waves provided by the sound source act on cymatic material 410 to produce a cymatic effect 415 as a series of concentric ripples on the surface of cymatic material 410.

It should be noted that cymatic material 410 may respond differently to different acoustic waves based on the physical properties of the cymatic material. However, for the purposes of description, the example of FIG. 4 demonstrates a series of concentric ripples on the surface of cymatic material 410 as a cymatic effect 415. Cymatic effect 415 is not limited to a series of concentric ripples on a surface of cymatic material 410. Other cymatic materials may respond differently to acoustic waves to produce a virtually infinite number of different cymatic effects based on the physical properties of cymatic material 410 and the characteristics and properties of the acoustic waves transmitted into cymatic material 410. Any cymatic effect 415 may be generated based on the physical properties of cymatic material 410 and the properties of the acoustic waves transmitted into cymatic material 410.

Figure 5:
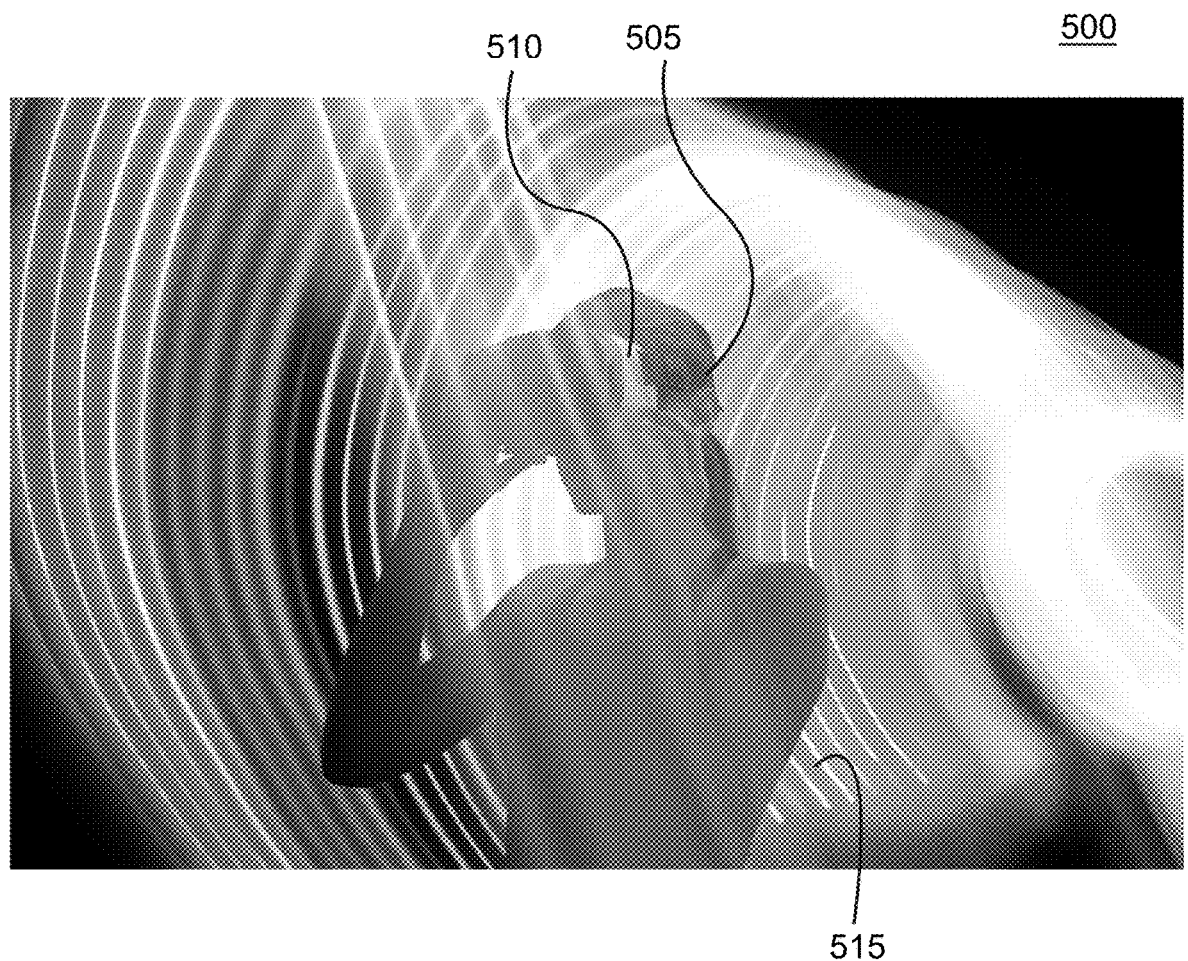
FIG. 5 illustrates an exemplary corresponding virtual reality display effect representative of the cymatic effect shown in FIG. 4.

FIG. 5 illustrates an exemplary display 500 which displays a corresponding virtual reality display effect 515 representative of cymatic effect 415 shown in FIG. 4. Display 500 includes a representation of a user 505 wearing a virtual reality device 510. It should be noted that display 500 may include a visual representation of user 505, part of a user 505 such as hands, feet, arms, etc., or no user 505 at all. However, for the purposes of explanation and description, user 505 is shown in virtual display 500 that may be provided within, for example, virtual reality device 510.

As shown in FIG. 5, cymatic effect 415 shown in FIG. 4 has been observed by electronic equipment and using the techniques discussed herein and processed to generate a virtual reality effect 515. For example, the exemplary cymatic effect 415, which is shown as a series of ripples on the surface of a cymatic material 410, shown in FIG. 4, has been converted or translated into a series of concentric beams of light as a virtual reality effect 515. Essentially, a physical cymatic effect 415 may be converted into a virtual reality effect 515 and immerse user 505 in the virtual environment of the physical cymatic effect 415.

It should also be noted that virtual reality effect 515 is provided as a simple example of a conversion or translation of cymatic effect 415 into a virtual reality effect 515. Virtual reality effect 515 may be substantially more intricate depending on the acoustic waves transmitted into cymatic material 410. For example, cymatic effect 415 may be representative of a single note played on a keyboard and virtual reality effect 515 may be provided as display 500 in response to the single note played on the keyboard. However, when acoustic waves representative of a complex song with multiple notes and percussive elements played simultaneously a more intricate cymatic effect may be generated than cymatic effect 415. Each of the multiple notes and percussive elements may be affect cymatic effect 415 such that corresponding virtual reality effect 515 includes representations of each element of the multiple notes and percussive elements within display 500. As previously mentioned, virtual reality effect 515 may be shown at any scale relative to user 500 to immerse user 500 within the virtual reality environment.

It should also be noted that various implementations of virtual reality device 510 may be used in connection with display 500. For example, virtual reality device 510 may provide a fully immersive environment where the senses of sight, and hearing may be totally immersed within virtual reality device 510. Virtual reality device 510 may also implement a real-world component into display 500 of virtual reality device 510 to provide an augmented reality environment. For example, at a concert, a virtual reality device 510 may be transparent to allow user 505 to see a singer or performer at the concert while also viewing cymatic effects fill the stage, the auditorium, or the surrounding environment of user 505. In other words, cymatic effects that correspond to the singer or performer's music or sound generation may be displayed through virtual reality device 510 as an augmented reality environment such that user 505 may still see elements of reality in the performance while also observing augmented reality effects that correspond to the acoustical properties of the environment around user 505. This is referred to as augmented reality because user 505 is still immersed in reality while receiving a virtual reality/augmented reality component to enhance the user's experience. Any environment may be suitable for an augmented reality environment, not just concerts. Augmented reality environments may also be provided at sporting events, recorded events, musical performances, non-musical performances, audible books, or any other environment which enjoys an aural component.

In one augmented reality environment for virtual reality device 510, a performer or singer on stage may produce acoustic energy (which may be amplified electronically) as part of a performance. This acoustic energy may be applied to a cymatic material to generate a cymatic effect, as discussed above. A processor, such as those disclosed herein may receive live video (or, alternatively, pre-recorded video) of cymatic effects produced by the acoustic energy generated by the performer or singer. Then, based on the cymatic effects, the processor, may generate virtual reality representations of the cymatic effects for a virtual reality device 510, which in this embodiment is an augmented reality device. Thus, the virtual reality representations of the cymatic effects displayed through virtual reality device 510 may be synchronous with the performer or singer's performance. They virtual reality representations of the cymatic effects of the acoustic energy produced by the performer or singer may be adjusted within virtual reality device 510 such that the virtual reality effects do not overlap while the performer or singer is performing on stage, or otherwise occlude user 505's view of the performer or singer. The processor may virtually track the performer on stage and adjust the virtual reality representations of the cymatic effects in real-time such that the virtual reality representations of cymatic effects do not prevent user 505 from seeing the performer on the stage. In this way, whether in an immersive virtual reality environment, or in an augmented reality environment, the performer in a live performance may be seen as performing in a virtual cymatic medium. As an alternative, the processor may develop a virtual reality representation of the cymatic effects of a performance such that the performer's choreography is adjusted or created such that user 505's view of the performer on stage is not occluded by a virtual reality representation of a cymatic effect during a performance. Any of the foregoing embodiments may be implemented in an immersive virtual reality environment or an augmented reality environment depending on what type of virtual reality device 510 is selected for the performance (e.g., immersive virtual reality goggles or non-immersive augmented reality glasses/goggles).

Even though particular combinations of features are disclosed in the specification, these combinations are not intended to limit the disclosure of the implementations. In fact, many of these features may be combined in ways not specifically recited in the claims and/or disclosed in the specification.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A cymatic system, comprising:
a processor to:
receive a video of a cymatic effect;
convert the video of a cymatic effect into a virtual reality effect;
receive input from a user that includes data representative of a user interaction with the virtual reality effect to create a modified virtual reality effect;
alter a visual representation of the virtual reality effect with the modified virtual reality effect; and
output the modified virtual reality effect to a display of a virtual reality device.

2. The cymatic system of claim 1, wherein the video of the cymatic effect is a two dimensional video.

3. The cymatic system of claim 1, wherein video of the cymatic effect is a three dimensional video.

4. The cymatic system of claim 1, wherein the video of the cymatic effect is a real-time video recording of the cymatic effect.

5. The cymatic system of claim 1, wherein the video of the cymatic effect is a pre-recorded video of the cymatic effect.

6. The cymatic system of claim 1, wherein the video of the cymatic effect includes video recorded by one or more video recording devices.

7. The cymatic system of claim 6, wherein the video of the cymatic effect includes video recorded by one or more video recording devices recording the cymatic effect from one or more different perspectives.

8. The cymatic system of claim 1, wherein converting the video of the cymatic effect into a virtual reality effect includes creating a virtual reality representation of the cymatic effect.

9. The cymatic system of claim 1, wherein the virtual reality device includes a virtual reality display.

10. The cymatic system of claim 1, wherein the virtual reality device provides an augmented reality display.

11. A method of producing a virtual reality display, comprising:
receiving, by one or more processors, a video of a cymatic effect;
converting, by the one or more processors, the video of a cymatic effect into a virtual reality effect;
receiving, by the one or more processors, input from a user that includes data representative of a user interaction with the virtual reality effect to create a modified virtual reality effect;
altering a visual representation of the virtual reality effect with the modified virtual reality effect, and
outputting, by the one or more processors, the modified virtual reality effect to a display of a virtual reality device.

12. The method of claim 11, wherein the video of the cymatic effect is a two dimensional video.

13. The method of claim 11, wherein the video of the cymatic effect is a three dimensional video.

14. The method of claim 11, wherein the video is a real-time video recording of the cymatic effect.

15. The method of claim 11, wherein the video is a pre-recorded video of the cymatic effect.

16. The method of claim 11, wherein converting the video of the cymatic effect into a virtual reality effect further includes analyzing the video of the cymatic effect, the cymatic effect being a physical response of a cymatic material to acoustic waves and creating, based on analyzing the physical response of the cymatic material to acoustic waves, a virtual reality effect as a virtual reality representation of the cymatic effect.

17. The method of claim 11, wherein the one or more processors are included in the virtual reality device.

18. The method of claim 11, wherein the display of the virtual reality device includes an augmented reality display.

19. A non-transitory computer-readable storage medium containing computer instructions which, when executed by a processor, cause the processor to perform a method, the method comprising:

receiving, by one or more processors, a video of a cymatic effect;

converting, by the one or more processors, the video of a cymatic effect into a virtual reality effect;

receiving, by the one or more processors, input from a user that includes data representative of a user interaction with the virtual reality effect to create a modified virtual reality effect;

altering a visual representation of the virtual reality effect with the modified virtual reality effect, and outputting, by the one or more processors, the modified virtual reality effect to a display of a virtual reality device.

* * * * *